Aug. 20, 1963 C. E. QUINN 3,101,394

HIGHWAY INFORMER KEYING SYSTEM

Filed Feb. 1, 1960

INVENTOR.
Clark E. Quinn

BY
Paul J. Ethington
ATTORNEY

United States Patent Office 3,101,394
Patented Aug. 20, 1963

3,101,394

HIGHWAY INFORMER KEYING SYSTEM

Clark E. Quinn, Rochester, Mich., assignor to General Motors Corporation, Detroit, Mich., a corporation of Delaware Filed Feb. 1, 1960, Ser. No. 6,055
4 Claims. (Cl. 179—82)

This invention relates to a system for transmitting messages to moving vehicles.

Instead of relying upon conventional road signs, it would be helpful if audio messages could be transmitted to vehicles moving past a given point on a highway so that the drivers of such vehicles could be informed of various road or traffic conditions without removing their eyes from the road in order to read the signs. Such transmission may be effected by employing a radio transmitter adjacent a given point of the highway and then utilizing vehicle-mounted receivers that are responsive to signals from this transmitter. In such a system it is preferable to use low frequency inductive coupling rather than high frequency radio transmission since the former can be of a very short range and also there will be little interference with other radio services since a little used portion of the radio frequency spectrum can be employed. Further, a low frequency transmitting system can employ components that are much less costly and much more reliable than if high frequency or microwave transmission were utilized.

A low frequency system, however, is not directional and so the transmitted signal cannot be confined to one lane as it could be if, for example, UHF transmission were used. If a signal is transmitted of a sufficient level to be easily detected by passing vehicles, this signal would be easily detected by vehicle-mounted receivers in vehicles traveling in all lanes of a highway. It would be desirable for the vehicle-mounted receivers to be responsive only if the vehicle is traveling in one direction while persons in vehicles traveling along the highway in the opposite direction would not receive the message. That is, it might be desirable to transmit a message such as "Exit Five—Toledo—One Mile Ahead" to westbound vehicles on a turnpike while this message would be meaningless and confusing to eastbound vehicles. Therefore, it is necessary to utilize a message transmission system wherein the vehicle-mounted receivers are normally unresponsive to the message signals but may be energized if the proper triggering signal is received at the proper time. The triggering system must be selected such that the vehicle-mounted receivers will not be triggered by noise such as is generated by the vehicle ignition system.

It is therefore the principal object of this invention to provide means for transmitting messages to moving vehicles. It is a further object to provide a message transmission system wherein vehicles moving in only one direction on a highway will be responsive. Another object is to provide a triggering system for a receiver whereby the receiver will be responsive to a given signal only after receiving a predetermined trigger signal.

In accordance with this invention, two separate signals are transmitted from apparatus positioned adjacent a roadway. A message signal is transmitted over a portion of the highway for a distance such that a vehicle traveling through this portion will receive the entire message. A trigger signal is established over a portion of the highway through which the vehicles pass prior to entering the area of the message signal. Vehicle-mounted receivers are provided that are adapted to remain unresponsive to the message signal until the trigger signal has been received. Thus, if a vehicle passes the trigger transmitter first, the vehicle-mounted receiver will be energized and the message signal will be received. Vehicles traveling in the opposite direction, however, will have left the area wherein the message signal may be received before the vehicle-mounted receiver has been energized by the trigger signal and so they will not be responsive to the message signal.

The novel features which are believed to be characteristic of the invention are set forth with particularity in the appended claims. The invention itself, however, both as to its organization and method of operation, together with further objects and advantages thereof, may best be understood by reference to the following description of one embodiment thereof, taken in conjunction with the accompanying drawing, in which:

Figure 1:
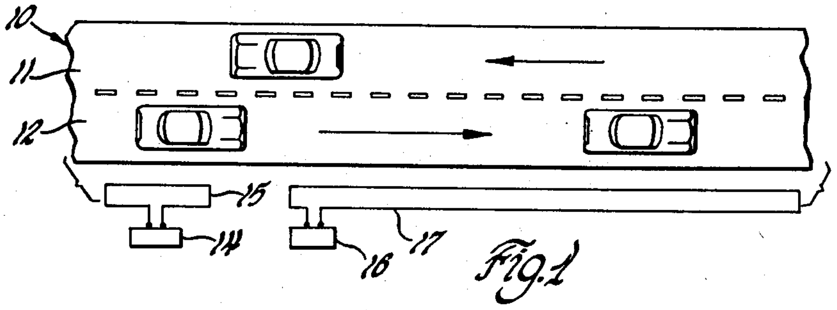
FIGURE 1 is a plan view of a message transmission system installation incorporating the invention.

Referring now to the drawing, and more particularly to FIGURE 1, there is shown a portion of a highway 10 having one lane 11 for vehicles traveling in one direction and a second lane 12 for vehicles traveling in the opposite direction as indicated by the arrows. Adjacent one portion of the highway 10 there is positioned a trigger transmitter 14 along with a loop antenna 15. Adjacent a second portion of the highway 10 immediately following the trigger transmitter is a message signal transmitter 16 along with an appropriate loop antenna 17. The loop antennas 15 and 17 may be composed of single turns of wire laid out horizontally on the surface adjacent the highway or may be buried in the ground. These loops are adapted to transmit very low frequency signals of around 10 kc. by inductive coupling. The loop antenna 17 would be a few feet wide and may be 500 to 1000 feet long, depending upon the length of the meessages to be transmitted and also upon the average traffic speed. The loop antenna 15 would be the same width but would be much shorter, perhaps 25 feet in length.

Figure 2:
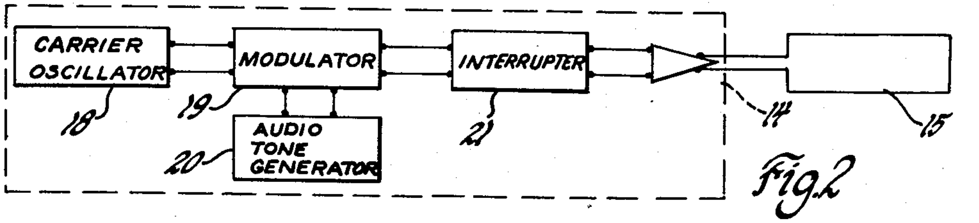
FIGURE 2 is a block diagram of the trigger transmitter which is utilized in the system of FIGURE 1.

In FIGURE 2 there is shown in block form the trigger transmitter 14 which comprises a carrier oscillator 18 that produces a signal of very low frequency such as 10 kc. A modulator 19 is adapted to amplitude modulate the output of the carrier oscillator in accordance with the signal produced by an audio tone generator 20. The amplitude modulated carrier is then fed to an interrupter 21 which chops the signal at a rate below the audio frequency spectrum such as 4 c.p.s. The output of the interrupter 21 has a waveform resembling that shown in FIGURE 5*a*. This interrupted amplitude modulated carrier signal is amplified and is used to drive the loop antenna 15.

Figure 3:
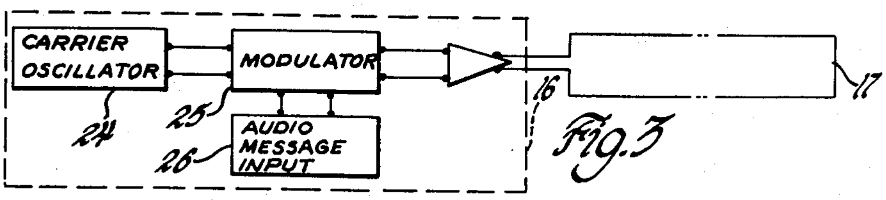
FIGURE 3 is a block diagram of the message transmitter which is utilized in the system of FIGURE 1.

FIGURE 3 shows in block form the message transmitter 16 which includes a carrier oscillator 24 which may be of the same frequency as the carrier oscillator 18. The output of this oscillator is fed to a modulator 25 which amplitude modulates the carrier signal in accordance with the output of an audio message source 26. The source 26 may be a microphone or a tape recorder which continuously repeats the desired message. The modulator output is amplified and used to drive the message signal loop antenna 17.

Figure 4:
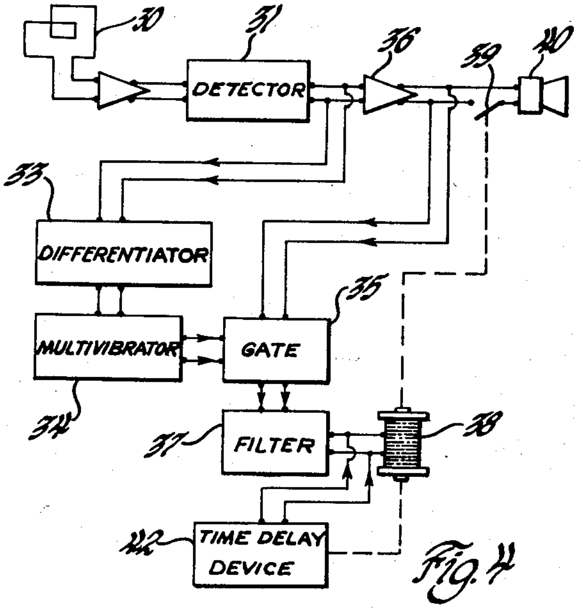
FIGURE 4 is a block diagram of a vehicle-mounted receiver which may be utilized with the system of FIGURE 1.
Figure 5:
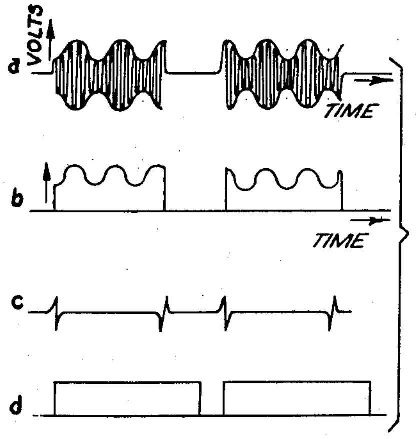
FIGURE 5 is a graphic representation of voltage waveforms appearing in the circuits of the invention.

In FIGURE 4 there is shown in block diagram a vehicle-mounted receiver which is adapted to be responsive to the message signal present adjacent the antenna 17 only when it has been previously triggered or activated by the trigger signal produced adjacent the antenna 15. The signal received by a vehicle-mounted antenna 30 is suitably amplified and applied to a signal detector 31. The waveform at the input to the detector 31 is similar to that shown in FIGURE 5*a*. The detector output follows the modulation envelope as shown in FIGURE 5*b* which is an audio signal superimposed on a D.C. level, both of which are periodically interrupted. This later signal is applied to the input of a differentiator 33 which has an RC time constant such that it produces a signal output as is shown in FIGURE 5*c*. This later signal is used to drive a one-shot multivibrator 34. The multivibrator 34 produces a square wave output, as shown in FIGURE 5*d*, having a pulse width that is slightly longer than the dwell time of the interrupter 21, but somewhat less than the repetition rate of the interrupter. The output of the multivibrator is used to energize a gate circuit 35 which may be, for example, an amplifying stage which is biased to conduction by the square wave output of the multivibrator. This gate 35 is positioned in circuit between an amplifier 36 and a bandpass filter 37 which is tuned to the frequency of the audio tone generator 20. The output of the filter 37 is used to drive a relay 38 which activates a pair of normally-open contacts 39 which are in series with the output of the amplifier 36. The amplifier 36 receives its input from the detector 31 and its output is connected through the contacts 39 to a signal utilization device which may be a loudspeaker 40 or other indicating means adapted to reproduce, or provide a warning in response to, an audio signal. Also included in the receiver circuit is a time delay device 42 which is energized by the relay 38 and is adapted to produce an output which provides hold-on operation or is effective to maintain the relay 38 in an energized condition for a predetermined period of time after the relay is once energized. This device 42 may be merely a D.C. source, an RC circuit, and a pair of contacts activated by the relay 38.

In the operation of this communication system, a receiver such as shown in FIGURE 4 mounted in a vehicle in the lane 12 would first pass through a region wherein the trigger signal is present. Near the antenna 15, a signal would be received which would result in an output from the detector 31 as shown in FIGURE 5*b*. This output would periodically trigger the multivibrator 34 which would be effective to open the gate 35 and maintain it open. This would allow the audio tone to reach the filter 37 and, if the tone was of the proper frequency, it would pass through and energize the relay 38. This would result in the audio tone being further applied to the loudspeaker 40 through the now closed contacts 39. Also, this would result in the energization of the time delay device 42 which would, by maintaining the relay 38 in an energized condition, maintain the contacts 39 closed for a period of time sufficient for the vehicle to pass through the portion of the highway adjacent the message transmission antenna 17. During this period of time the audio message produced by the source 26 would be received and would drive the loudspeaker 40 such that the occupants of the vehicle would hear the desired message.

Vehicles traveling in the lane 11 or in the opposite direction would not receive the message at all. This is because the contacts 39 in the vehicle-mounted receiver would remain open until the vehicle had passed the area of message signal reception adjacent the antenna loop 17. This is true even though the particular message might include audio components equal to that produced by the audio tone generator 20. Such audio components might be capable of energizing the relay 38 if applied thereto, but would not reach this relay since the gate 35 would not be opened. An audio signal received from a source other than the trigger transmitter would probably never be interrupted at the particular rate necessary to open the gate 35 by triggering the multivibrator 34 at the proper intervals. Even though the vehicle-mounted receiver on a vehicle in the lane 11 would be activated when the vehicle passed the antenna 15, there would be no subsequent message reception due to the limited range of the signal produced by the antenna 17.

While there has been illustrated a particular embodiment of the invention, it will of course be understood that the invention is not limited thereto. Persons skilled in the art may make various modifications such as the use of a different frequency range for transmission and so it is contemplated that the appended claims will cover any such modifications as fall within the true scope of the invention.

I claim:

1. In a system for transmitting information to a vehicle which is moving in a given direction along a predetermined course, message signal transmitting means positioned adjacent one portion of said course for continuously transmitting a message signal containing the desired information, trigger signal transmitting means positioned adjacent a portion of said course immediately preceding said one portion for transmitting a trigger signal, vehicle-mounted receiving means for receiving said message signal when the vehicle is on said one portion of said course and for receiving said trigger signal when said vehicle is on said preceding portion of said course, signal utilization means connected to said receiving means for responding to said message signal, gating means connected between said receiving means and said utilization means, and control means connected to said receiving means and being responsive to said trigger signal to operate said gating means.

2. In a system for transmitting information to a vehicle which is moving along a highway, trigger signal transmitting means positioned adjacent a first portion of said highway for transmitting a trigger signal modulated at a predetermined frequency and interrupted at a rate much lower than said frequency, message signal transmitting means positioned adjacent a second portion of said highway for transmitting a message signal modulated by the desired information, said second portion of said highway being immediately adjacent said first portion, receiving means mounted on said vehicle for receiving said message signal and said trigger signal and for producing a demodulated output, utilization means connected to receive said demodulated output, gating means connected between said receiving means and said utilization means, and trigger signal responsive means connected to receive said demodulated output for operating said gating means.

3. In a communicating system, transmitting means for transmitting a message signal modulated by the desired information and also for transmitting a trigger signal modulated by a predetermined audio tone and interrupted at a rate much lower than said tone, remote receiving means for receiving said message signal and said trigger signal for producing a demodulated output, utilization means connected to receive said demodulated output, first gating means connected between said receiving means and said utilization means, frequency responsive means connected to receive said demodulated output and for operating said first gating means when said audio tone is present in said demodulated output, second gating means connected between said receiving means and said frequency responsive means, and means connected to receive said demodulated output and for operating said second gating means in response to said interruptions in said tone.

4. In a system for transmitting information to a vehicle which is moving along a highway, trigger signal transmitting means positioned adjacent a first portion of said highway for transmitting a trigger signal modulated by a predetermined audio tone and interrupted at a rate much lower than said tone, message signal transmitting means positioned adjacent a second portion of said highway for transmitting a message signal modulated by the desired audio information, said second portion of said highway being immediately adjacent said first portion, receiving means mounted on said vehicle for receiving said message signal and said trigger signal and for producing a demodulated output, utilization means connected to receive said demodulated output, first gating means connected between said receiving means and said utilization means, frequency responsive means connected to receive said demodulated output for operating said first gating means when said audio tone is present in said demodulated output, second gating means connected between said receiving means and said frequency responsive means, and means connected to receive said demodulated output and for operating said second gating means in response to said interruptions in said tone.

References Cited in the file of this patent

UNITED STATES PATENTS

| | | |
|---|---|---|
| 2,110,960 | McDonald | Mar. 15, 1938 |
| 2,254,218 | Halstead | Sept. 2, 1941 |
| 2,429,607 | Capen | Oct. 28, 1947 |
| 2,542,803 | Evans et al. | Feb. 20, 1951 |
| 2,554,906 | Herbold | May 29, 1951 |
| 2,980,794 | Hargreaves et al. | Apr. 18, 1961 |